United States Patent [19]

Roberts, Jr.

[11] 4,075,891
[45] Feb. 28, 1978

[54] SELF-LEVELING STATIC WHEEL BALANCER

[75] Inventor: Thomas E. Roberts, Jr., Saratoga, Calif.

[73] Assignee: FMC Corporation, San Jose, Calif.

[21] Appl. No.: 794,581

[22] Filed: May 6, 1977

Related U.S. Application Data

[62] Division of Ser. No. 633,779, Nov. 20, 1975, Pat. No. 4,041,781.

[51] Int. Cl.² .............................................. G01M 1/04
[52] U.S. Cl. .................................................. 73/483
[58] Field of Search .................. 73/482, 483, 484, 485

[56] References Cited

U.S. PATENT DOCUMENTS

| 2,842,966 | 7/1958 | Rued | 73/483 |
| 3,096,655 | 7/1963 | Peterson | 73/483 |

Primary Examiner—Herbert Goldstein
Attorney, Agent, or Firm—C. E. Tripp

[57] ABSTRACT

A static vehicle wheel balancer has a base which is supported on the floor and which mounts a vertical post. A wheel balance head is provided for receiving and centering a tire and wheel assembly to be balanced and has a level for indicating unbalance. A universal pivot between the balance head and the post is provided wherein the pivot point of the balance head is maintained coincident with the post axis, even when the post axis is inclined from the vertical. In one embodiment, the pivot assembly is formed by an upwardly facing spherical anvil surface that supports three equal diameter balls. The balancing head mounts a single pivot ball that is supported by the three support balls. Resilient means are provided for cushioning the pivot ball. In another embodiment of the invention, the universal pivot action is obtained by the use of a Hooke universal joint. Another embodiment embodies a universal joint of the Hooke type wherein the spider arms are made in the form of flexible blades. Another embodiment embodies a universal pivoting assembly wherein two sets of cylindrical rollers roll on cooperating concave and convex cylindrical surfaces.

2 Claims, 13 Drawing Figures

FIG_1C

FIG_4

FIG_5

SELF-LEVELING STATIC WHEEL BALANCER

This is a division of application Ser. No. 633,779, filed Nov. 20, 1975, now U.S. Pat. No. 4,041,781.

BACKGROUND OF THE INVENTION

1. Field of the Invention

This invention relates to static wheel balancers for determining the balance of vehicle wheels, and more particularly, it relates to static wheel balancers of the type having a pivot mounting for supporting a wheel balancing head upon a vertical support post.

2. Description of the Prior Art

The principle of a common type of static wheel balancer is in itself a simple one. The wheel (with a mounted tire) is placed on a wheel balancing head mounting a bubble level for balancing. The head is supported by a pivot mechanism, usually a hard steel ball or sphere which rests on the anvil of a post or other vertical support means coaxial with the wheel and balancing head. If the wheel to be balanced is out of balance, the wheel balancing head will tilt about an axis in a horizontal plane, and this tilt will manifest itself by an off-center reading on the bubble level. The balance error is usually corrected by the application of one or more balance weights to the rim flange of the wheel. Balancers of this type subject the pivot ball and supporting structure to shock loads in cases where a heavy wheel and tire assembly are initially dropped onto the balancing head, and special means are often provided to protect the ball from these loads.

The U.S. Pat. No. 3,055,221, issued Sept. 25, 1922 to Bageman et al, discloses a static wheel balancer of the afore-described type having a vertical support post or pedestal formed with a flat faced tappet or anvil. The balancing head is pivotally supported on the anvil by a pivot ball rigidly mounted in the balancing head. A cam mechanism is provided to lower the anvil so that the balance head rests on a support sleeve when the wheel is placed on the head.

A similar pivot ball and anvil construction for supporting the balancing head is shown in U.S. Pat. No. 3,164,996, issued Jan. 12, 1965 to Carrigan and assigned to the FMC Corporation. This patent also shows structure for lowering the anvil during wheel application. Furthermore, in this patent, the wheel centering cone of the balancing head is resiliently supported to minimize damage to the pivot ball and the supporting anvil from impacts that occur when a wheel assembly is dropped onto the balancing head.

The U.S. Pat. No. 3,280,640, issued Oct. 25, 1960 to Fuertges, also employs a single, rigidly mounted pivot ball supported on an anvil. The anvil post is slidably mounted in a support sleeve and the post is initially supported by a spring. When the wheel is placed on the balancing head, the post is lowered against the force of the spring until the lower end of the post is solidly seated on a shoulder. Oil bleed holes, valved by the post, are provided in the sleeve to control deceleration of the post.

SUMMARY OF THE INVENTION

For reasons to be explained in detail later, one problem encountered in the static wheel balancers of the patents mentioned above is the necessity for accurately maintaining the vertical orientation of the axis of the vertical post that mounts the anvil so that the pivot ball support plane of the anvil lies in the horizontal. If post axis is not truly vertical, the bubble will not give a correct reading of wheel unbalance. In practice, maintaining vertical orientation of the post axis necessitates leveling the balancer and releveling thereof whenever the balancer is moved to a new position.

Also, and as mentioned, in some prior wheel balancers of the type in which the balancing head is supported by the engagement of a sphere or pivot ball with a hardened anvil plate, such as those of the Bageman et al and Carrigan patents, means were provided for lowering the balance head onto a support sleeve and disengaging the anvil from the pivot ball before balancing, in order to prevent damage to the ball by impact stresses that would be generated if the wheel should be dropped onto the balancing head when it is supported by the ball. The Fuertges patent discloses a valved oil bleed system, a post supporting spring and a bottom post shoulder for reducing these shocks. These extra shock protection mechanisms are of particular importance in balancers wherever the pivot ball has a small diameter in order to minimize the effect of post axis misalignment errors, to be described presently. However, decreasing the ball diameter increases the unit stresses at the pivot and the attendant possibility of deformation of the ball and the anvil.

The subject invention is an improvement in the pivot mechanism that mounts the balancing head on the post which eliminates the need for accurately and frequently aligning the post axis (leveling of the balancer) and wherein the pivot mechanism is so rugged as to make it unnecessary to disengage the anvil from the ball during placement of the wheel assembly on the balancing head and does not require a hydraulic, spring loaded decelerating system for the anvil, as in the Fuertges patent.

The present invention eliminates the aforesaid realignment requirement by utilizing a pivot structure wherein all pivot axes of the balancing head intersect at a common point, and that point always lies on the post axis and at the intersection of that axis with the vertical. During balancing, there is not rolling action of a pivot ball along a planar anvil face. The invention comprises a base, vertical support means in the form of an upright support post or pedestal for the balancing head, a level on the head and universal pivot means supporting the balancing head on the post, which pivot means provides a pivot point having the geometrical characteristics described above.

The preferred embodiment of the pivot structure, comprises a single relatively large diameter ball on the balancing head, a spherical surface formed on the anvil concentric with said ball, and a plurality of support balls (preferably three) resting on the anvil surface and supporting the balancing head ball. The center of the balancing head ball is the vertical or effective universal pivot point for the balancing head, and the pivot structure eliminates the need for frequent releveling of the balancer.

Accordingly, it is an object of the present invention to provide a static wheel balancer which need not be precisely leveled in order to provide accurate balancing of vehicle wheels placed thereon. Since the pivot action is not one of rolling the pivot ball on a plane, the diameter of the pivot ball can be increased without introducing balancing errors, which increase in diameter increases resistance to ball deformation under shock loads. The support balls can also have a relatively large diameter. This increase in ball diameter makes it unnecessary to disengage the balance head ball from its support surface before balancing. Preferably, the effect of severe shocks are further reduced by providing resilient preload means for the balancing head pivot ball to limit the shock of forces imposed on the head by the placing of a wheel thereon.

Another feature of the preferred multi-ball pivot structure described above is that the wheel can be spun before or after stake balancing in order to check for severe dynamic unbalance.

The embodiment forming the subject matter of this divisional application has the same mode of operation as that of the aforesaid multi-ball pivot structure but employs two perpendicular sets of rollers and associated cylindrical anvil and swivel block surfaces, instead of balls and spherical surfaces.

Other embodiments of the invention employ a Hooke or a Hooke type universal joint as the pivot structure, which joints provide a virtual or effective pivot point that is geometrically located in accordance with the principle of pivot point location of the embodiment embodying a plurality of balls.

The invention, together with additional objects and advantages thereof, is best understood by reference to the following description of preferred embodiments particularly as illustrated by the accompanying drawings.

EXPLANATION OF WHY PRIOR BALANCERS MUST BE LEVELLED

As previously described, typical prior wheel balancers of the type to which this invention relates include a post that projects upwardly from a base structure that supports the post on the floor. The post has a generally vertical axis and terminates in a hardened anvil having a planar surface that is perpendicular to the axis of the post. A wheel balancing head includes means for mounting and centering the wheel to be balanced. The balancing head includes a bubble level and rigidly mounts a pivot ball that is supported on the anvil of the post. The ball provides a universal pivot at the anvil surface and theoretically when a balanced wheel and tire assembly is placed on the wheel balance head, the plane of the wheel assembly should be horizontal. However, and for reasons to be explained, these conditions are only attained when the wheel balancer is levelled. When the wheel balancer is levelled, the plane of the anvil upon which the pivot ball is supported is horizontal and the axis of the anvil post, which is perpendicular to the plane of the anvil, is vertical and passes through the pivot point at the ball periphery. Levelling of the balancer can be obtained by either constructing the balancer so that it is levelled when its base is placed on a floor having a level or horizontal surface, or as is generally the case, by forming the base of the balancer with levelling screws so that once the balancer is set in its operating position, it can be levelled by the levelling screws while observing the level bubble mounted on the balancing head.

If the balancer under description is not levelled or if it is moved from a position where it was levelled to another position wherein the floor is in a new plane, errors in the application of correction balance weights will occur.

The explanation of the need for levelling prior balancers will be made in connection with FIGS. 1, 1A and 1B. These figures are diagrammatic and are not to scale. The angles of inclination are exaggerated and the size of the pivot ball relative to the remaining parts is exaggerated to make it possible to illustrate the geometrical conditions involved.

Figure 1:
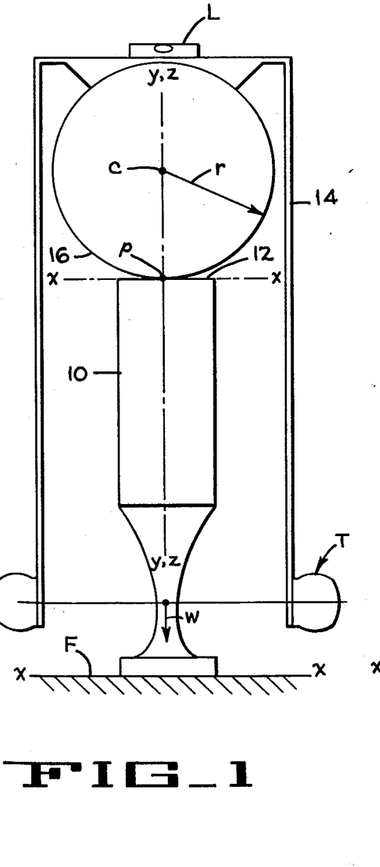
FIG. 1 - 1B are schematic diagrams illustrating errors inherent in prior ball pivot balancers when they are not leveled.

The diagram of FIG. 1 shows the basic elements of a typical prior balancer. The balancer includes a post 10 which has a base (not shown in detail) for support on the floor F and which has a hardened, planar anvil surface 12. The balance head 14 is supported on the anvil 12 by means of a hardened ball 16 rigidly mounted in the head. The wheel and tire assembly T is mounted on the balance head 14, it being understood that the mounting in the figures is highly diagrammatical. It is important to note that in this discussion of FIGS. 1- 1B, the wheel and tire assembly T is assumed to be perfectly balanced.

In the situation of FIG. 1, the pivot ball 16 has a center $c$ and a radius $r$ and provides a pivot point $p$ with the anvil 12. For simplicity of illustration, it is assumed in FIG. 1 that the floor F is level and hence lies in a horizontal plane $x—x$ so that the face of the anvil 12 is also in a horizontal plane $x—x$. Under these conditions, the vertical axis is $z—z$ of the post 10 and is coincident with a vertical line $y—y$, both of which pass through the pivot point $p$ of the ball.

Figure 1A:
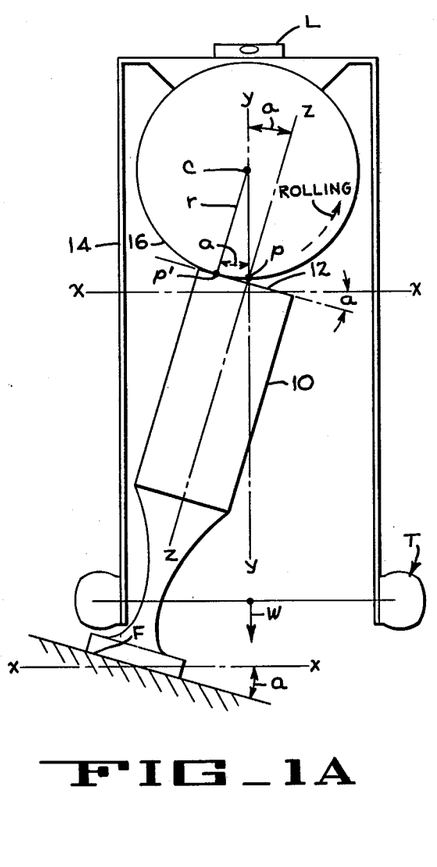

FIG. 1A illustrates a theoretical condition that might be assumed to exist when the floor F is inclined by an angle $a$ from the horizontal plane $x—x$. Actually, the condition of FIG. 1A never occurs with a balanced wheel, but it is presented to clarify the explanation of a situation that does occur and which will be described in connection with FIG. 1B. In FIG. 1A, the face of the anvil 12 is inclined from the horizontal plane $x—x$ by a angle $a$, as is the axis $z—z$ of the post 10. If the action of gravity on the wheel, tire and balance head assembly, indicated at W, were effective to bring the plane of the balanced tire assembly T into the horizontal plane $x$—$x$, the ball 16 would roll up the inclined anvil face 12, rotating through the angle of inclination a in the process. No error would be present and the center C of the wheel assembly T would lie in the vertical line $y$—$y$ through the center c of the ball. After such rolling of the ball, the new point of contact of the ball with the anvil 12 would be at a point $p'$ and the original point of contact $p$ would be above the surface of the anvil 12. Also, the axis $z$—$z$ of the post 10 would be inclined from the vertical $y$—$y$ by the angle of inclination $a$, and the new pivot point $p'$ would be offset from the post axis $z$—$z$.

Consideration will show that the condition of FIG. 1A will not actually occur because the original pivot point $p$ has been raised from the anvil surface and the action of gravity, indicated at W, will bring the original point $p$ back down towards the anvil 12.

Figure 1B:
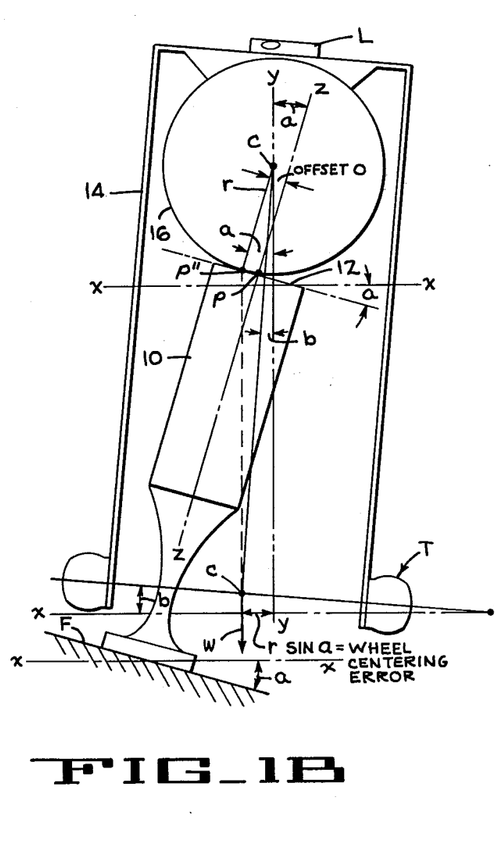

The actual conditions that occur with a balanced wheel when the balancer is not levelled are illustrated in FIG. 1B. It will be noted in FIG. 1B that the ball does not actually roll up the anvil as far as in FIG. 1A but that the plane of the wheel and tire assembly T is still inclined from the horizontal plane $x$—$x$ but by an angle $b$ which is smaller than the inclination angle $a$. At the anvil, the new point of contact $p''$ of the ball with the anvil is closer to the original point of contact $p$ but is still offset therefrom. The new pivot point $p''$ is also offset from the post axis $z$—$z$ by an offset $o$. As indicated by the vertical dotted line from the point of contact $p''$ to the wheel assembly center C, the wheel center C is offset from the vertical line $y$—$y$ passing through the center c of the ball by a distance equal to $r \sin a$.

The difficulty with the situation of the prior balancer shown in FIG. 1B is that even though the tire and wheel assembly T are perfectly balanced, the bubble will indicate the unbalance equal to the angle $b$, and a pseudo-balance weight will be applied by the operator to the wheel assembly to level the bubble. The result is that a perfectly balanced wheel and tire assembly is thereby placed out of balance. Thus if the tire and wheel assembly were initially out of balance, the balance weights applied to level the bubble would include a weight equal to the aforesaid pseudo-balance weight and hence the unbalanced tire would remain out of balance by the amount of the pseudo-balance weight.

The conditions shown in FIG. 1B present a dilemma. The errors described could be reduced to zero if the contact point $p$ with the anvil were made a true point contact (e.g. a pointed cone) instead of providing the contact of a sphere. However, this construction is impossible in shop equipment, particularly where it is subjected to shock loads during the mounting of a tire and wheel assembly on the equipment. Accordingly, the pivot is provided by a hardened ball. If the ball is made very small, the indentation or "Brinelling" effect, resulting from shock loads might still be unacceptable. On the other hand, the larger the radius of the pivot ball, the greater the error introduced by the effect illustrated in FIG. 1B. A typical compromise construction employs a rather small ball having a radius $r$ of about 3/32 inch. Even with a ball this small, errors are introduced if the apparatus is not level and the order of these errors is provided by the following example.

EXAMPLE

Assume tire weighs 1000 oz.
Wheel 8 inches radius to the rim flange
Ball 3/16 inch diameter, $r = 3/32$ inch
Maximum balance weight error to be $\frac{1}{4}$ oz.

$\frac{1}{4}$ oz at 8 inches radius = 2 oz = inches
2 oz - inches/1000 oz = 0.002 inch wheel centering error = $r \sin a$
$r \sin a = 0.002$
$3/32 \sin a = 0.002$
$\sin a = (0.002 \times 32)/3 = 0.021$
$a = 1.22°$

SIGNIFICANCE OF THE EXAMPLE

The above calculations show that if a balancing device of the type shown in FIGS. 1 - 1B is out of level by as small an angle as 1.22°, a wheel centering error will be produced which is equivalent to a balance weight error of $\frac{1}{4}$ ounce. Thus the balancer, operating under these conditions, would indicate by means of its bubble, the need for the application of a pseudo-balance weight of $\frac{1}{4}$ ounce to a perfectly balanced tire and if the tire were out of balance, the amount of balance weight applied thereto to center the bubble would include a psudeo-weight of $\frac{1}{4}$ ounce. On the above assumptions this slight throwing of the balancer out of level removes the assumed level of tolerance of $\frac{1}{4}$ ounce error in the balance weights applied to the wheel. Thus the balancers of the type being described must always be levelled and if moved from a position at which they were levelled to another position, they must usually be relevelled.

PRINCIPLE OF THE PRESENT INVENTION

Figure 1C:
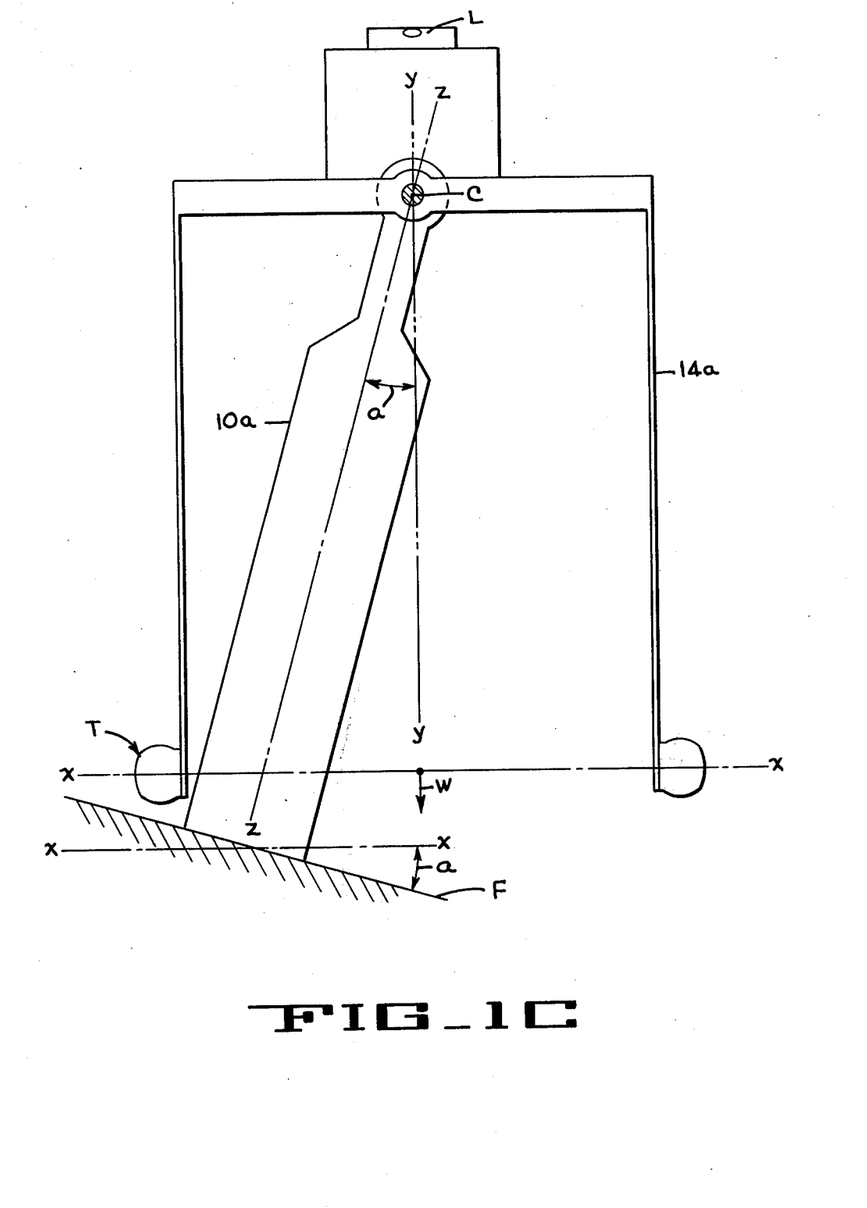
FIG. 1C is a highly schematic diagram illustrating the principle of the balancer of the present invention.

FIG. 1C illustrates, in a highly diagrammatic manner, the principle of the balancer of the present invention. As before, the balancer includes the post 10a supported on the floor F and having a vertical axis $z$—$z$. The balance head 14a mounts the tire and wheel assembly T as before. However, under principles of the present invention, the pivot point c of the balance head 14a upon the post 10a is always at the intersection of the post axis $z$—$z$ and a vertical line $y$—$y$ passing through the pivot point. Thus even if the balancer is not level, that is, if the post axis $z$—$z$ is inclined by an angle $a$ as before, the pivot point c for the balancing head remains coincident with the post axis $z$—$z$. There are none of the error-introducing rolling effects previously described and the plane of a perfectly balanced wheel and tire assembly will always lie in a horizontal plane $x$—$x$. As a result, a balancer which employs this principle can even be placed on casters. The balancer can be bodily rotated in a given position or can be moved from place to place without need for levelling and relevelling because the balancing head is self-levelling.

A preferred and a modified embodiment of a balancer that operates upon the basic principles of FIG. 1C and which has the advantages heretofore mentioned, as well as others, will now be described.

DESCRIPTION OF THE PREFERRED EMBODIMENT

Figure 2:
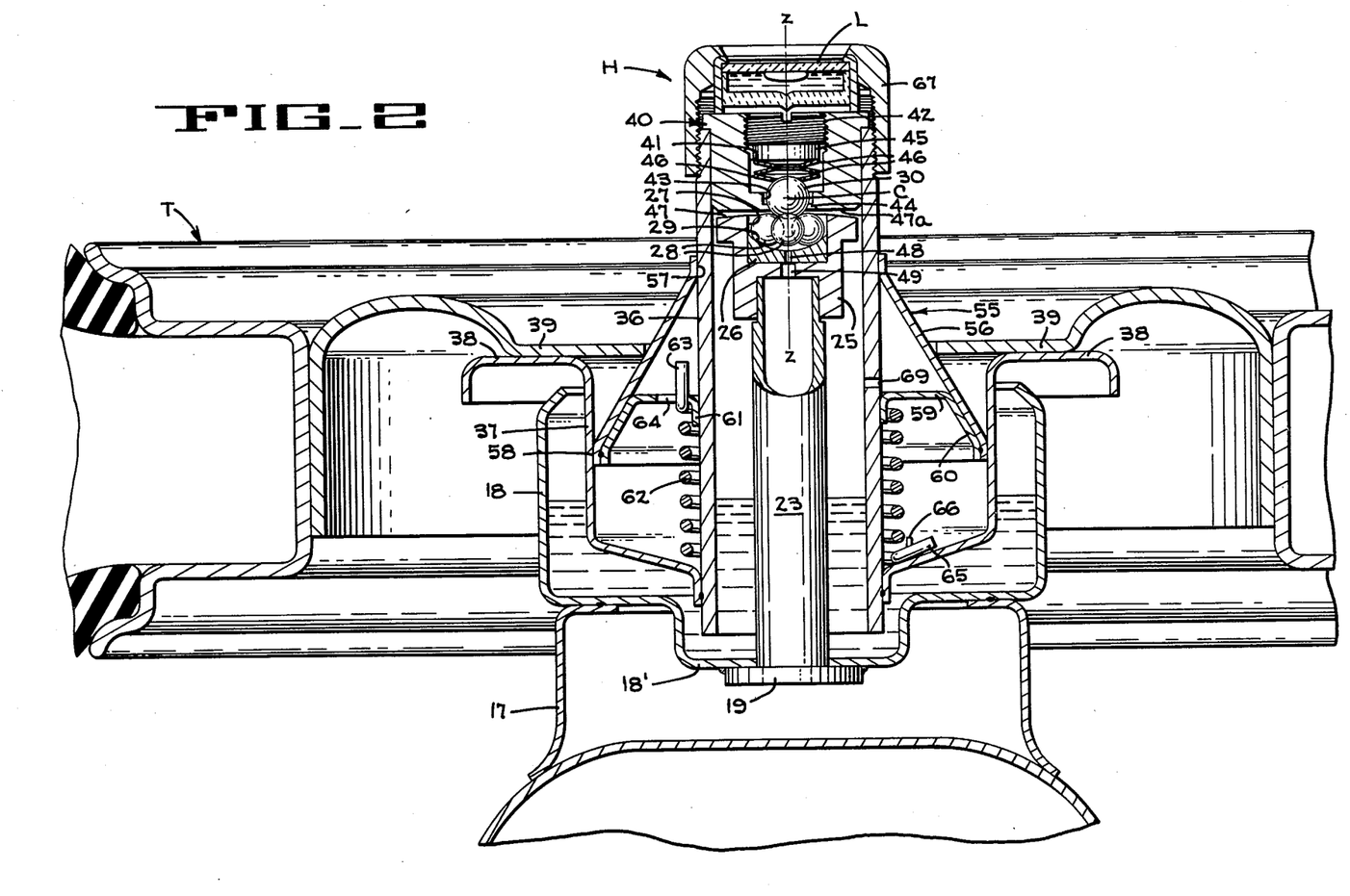
FIG. 2 is a vertical section through the preferred embodiment of the subject invention, with a fragmentary showing of a vehicle wheel and tire assembly mounted for balancing.

Referring to FIG. 2, the balancer of the present invention will be seen to comprise a supporting base 17 to which is welded an annular bowl 18 that has a cup shaped lower central portion 18'. The bottom of base 17 is formed with means (not shown) for support by the floor which may include levelling screws for very coarse levelling or which may not require levelling screws when supported on reasonably level surfaces.

A circular plate 19, welded to the underside of the recessed portion 18' of the bowl 18, carries a vertically extending tubular pedestal or post 23 which projects upwardly through the bowl. An anvil mounting member 25 is pressed on the upper, reduced diameter end of the post. The member 25 mounts a hardened steel anvil 26, which is disposed in the lower end of a cylindrical recess 27 of the member 25, to define a cup-like retainer for three hardened steel support balls or spheres 28. The three balls 28, which have identical diameters, are in rolling contact with a concave spherical surface 29 of the anvil 26.

A pivot ball or sphere 30 is mounted in a balancing head H and rests on the support balls 28. Preferably the pivot ball 30 is larger than the support balls 28, but this is not essential. In the preferred embodiment, the sphere 30 is a hardened steel ball having a diameter of ½ inch and the hardened support balls 28 have a diameter of ⅜ inch.

The balancing head H comprises a central sleeve 36 having a cup-shaped wheel supporting member 37 welded to its lower end portion. The wheel supporting member 37 is provided with an upper radial flange 38 upon which the lug flange 39 of the tire and wheel assembly T rests during the balancing operation.

In order to mount the pivot ball 30 and a level in the balancing head, a cylindrical plug 40 is received within the upper end of the sleeve 36, as by a press fit. The plug 40 has an upwardly opening central recess 41 into which a preload screw 42 is threaded. Near its lower end the plug 40 has a reduced diameter opening 43 which receives the pivot ball 30. The reduced diameter opening 43 terminates in a ball retaining lip 44 which has a partial spherical surface that engages the ball 30. The lower end of the preload screw 42 is formed with a pad 45 which engages the uppermost one of three Belleville washers 46 to urge them downwardly to resiliently retain the ball 30 against the lip 44. The spring rate of the Belleville washer assembly is so chosen and the preload screw is so adjusted that during the balancing operation the preload force on the springs more than overcomes the weight of the wheel and tire assembly and holds the sphere 30 in position against the lip 44 for support by the three lower spheres.

The upper face 47 of the support ball retainer 25 is beveled slightly to clear the opposed lower face 47a of the plug 40 during balancing. The normal clearance between these opposed faces is about 1/32 inches and the Belleville springs are preloaded to exert a force of about 100 pounds on the pivot ball 30. Thus, in cases where the springs are deflected by loads that exceed the preload of 100 pounds, the ball 30 will compress the Belleville washers and ride up into the opening 43. When this occurs, the upper face 47a will engage the lower face 47 and transmit such excess loads and shocks directly to the support pedestal 23.

The use of Belleville springs in the association just described forms the subject matter of the copending application of James L. Wiederrich, Ser. No. 633,894, filed Nov. 20, 1975, now U.S. Pat. No. 4,005,607 and assigned to the FMC Corporation.

It is essential that the radius of the concave spherical ball supporting anvil surface 29 is equal to the sum of the diameter of a support ball 28 and the radius of the balance head pivot ball 30. Thus, the center $c$ of the support ball 30 is at the center of the spherical anvil surface 29, and the center $c$ represents the virtual or effective pivot point of the balance head H. The center $c$ always remains coincident with the axis $z-z$ of the post 23 no matter what position the balance head assumes within the limits of normal operation. Furthermore, if the axis $z-z$ of the post 23 is inclined from the vertical, because the balancer is not levelled, the pivot point $c$ remains coincident with the post axis and, consequently, the horizontal orientation of the plane of the wheel support flange 38 of the balancing head is unaffected.

The anvil plate 26 is apertured at 48 which aperture is aligned with an aperture 49 in the cylindrical member 25 to drain any liquid that might accumulate on the spherical anvil surface 29.

As in the aforesaid Carrigan U.S. Pat. No. 3,164,996, a wheel-centering cone assembly 55 is slidably mounted on the sleeve 36 of the balancing head. The cone assembly comprises a truncated cone 56 having an inner cylindrical guide surface 57 at its upper end slidably engaging the outer surface of the sleeve 36, and an outer cylindrical guide surface 58 at its lower end slidably received within the cup-shaped member 37. A lower guide member 59 is provided with a frusto-conical portion 60 that is welded to the lower end of the cone 56. The inner end of the guide 59 is formed to provide a downwardly extending annular guide lip 61 which slidably embraces the sleeve 36. A spring 62 surrounds the sleeve 36 with its upper end 63 bent upwardly to project through a slot 64 in the guide 59. The lower end 65 of the spring abuts the bottom of the wheel support member 37 and is confined against movement by a bracket 66 fixed to the member 37. The spring 63 urges the cone assembly 55 to its uppermost position (not shown) but is depressed by the weight of the wheel to the position shown in FIG. 2 until the wheel lug flange 39 rests on the balancing head flange 38.

A spirit level assembly L is mounted on the upper end of the plug 40, being held in place by a cap 67 threaded on the sleeve 36. In the embodiment illustrated, the level assembly L and the apparatus for holding it in place is identical to that disclosed in the aforesaid Carrigan U.S. Pat. No. 3,164,996.

In preparing the balancer for operation, the balancing head H is first assembled by placing the spring 63 in place, then the cone assembly 55 is slipped over the upper end of the sleeve 36, and the cap 67 is screwed onto the upper end of the sleeve to mount the level. Oil is then poured into the bowl 18, and the assembled balancing head H is inserted over the upper end of the post 23 with the lower end of the head projecting into the oil in the bowl. A bleed hole 69 is provided in the sleeve 36 to permit the escape of air as the oil rises in the lower end of the sleeve.

It is to be noted that, during the insertion of the lower end of the head into the oil, the large pivot ball or sphere 30 comes to rest on the three support balls or spheres 28, causing the latter to distribute themselves around the concave semi-spherical anvil surface 29. When a wheel is placed on the balancer, the additional force caused by the weight of the wheel may cause the support balls 28 to redistribute themselves slightly on the concave spherical anvil surface 29 but the support balls 28 can never roll very far up the anvil surface and hence the center of the support ball 30 remains at the center of the concave anvil surface 29 and on the post axis $z-z$.

If the wheel is in balance, the axis of the balancing head H will remain vertical and the bubble level mechanism L will indicate no unbalance. If the wheel is out of balance, the balancing head will pivot about its virtual or effective pivot point c at the center of the pivot ball 30 and this will manifest itself as an off-center reading on the bubble in the level L. The presence of the viscous liquid in the balancer dampens out oscillations of the balancing head so that a bubble level reading may be quickly made.

The pivot assembly, including the support ball or sphere 30 and the three supporting balls or spheres 28 makes it unimportant whether the axis of the vertical post 23 is perfectly vertical or not. Within limits, determined by the clearance between the relatively moving parts, the center c of the pivot ball 30 is always the virtual or effective pivot point and remains coincident with the post axis $z-z$. Thus, the balancer need not be precisely leveled initially and need not be frequently releveled. In fact, the wheel balancer or its leveling screws (if present) may even be mounted on casters. A rotation of the entire balancer or a re-positioning thereof does not affect balancing accuracy. The combined resilient effects of the spring 63 and the Belleville washers 46 and the close spacing of the opposed faces 47,47a also protect the pivot mounting apparatus from damage due to impact loading or to extreme constant weight loading. Further, the pivot ball 30 is always in engagement with the anvil surface 29 and no load-unload operation is necessary with this apparatus. This eliminates need for the usual load-unload handle, present on most other balancers, and the wheel rim weights may be added to the wheel without the necessity of first unloading the pivot ball. Finally, the statically balanced wheel can be spun on the three ball support, if desired, to give an indication of possible dynamic unbalance without changing the level bubble indication of static balance.

EMBODIMENT OF FIG. 3

Figure 3:
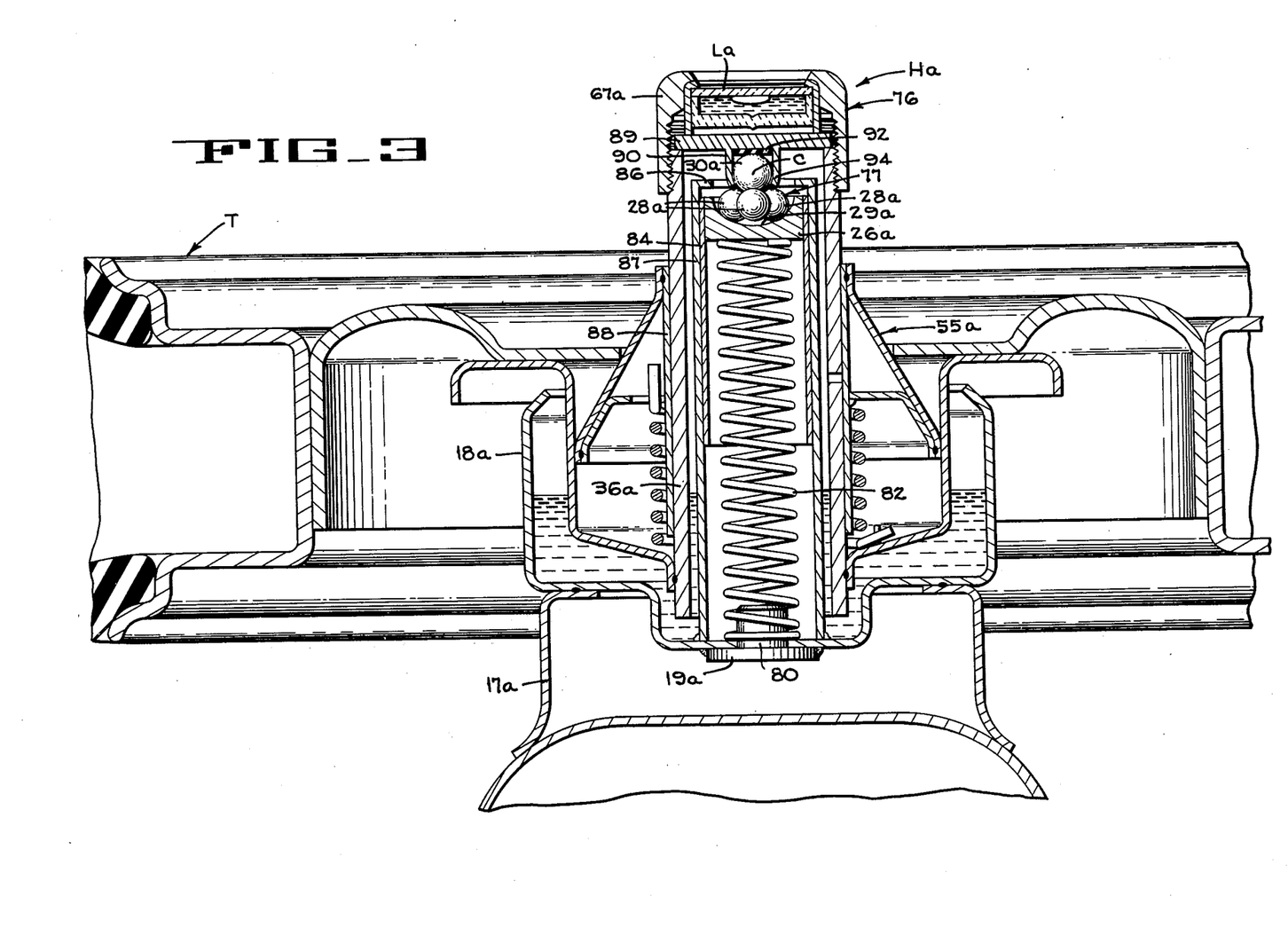
FIG. 3 is a vertical section similar to FIG. 2 but illustrating an alternative embodiment of the subject invention.

The embodiment illustrated in FIG. 3 operates on the same pivot ball principle as that previously described but employs a modified structure for minimizing shocks on the balls. The form of FIG. 3 comprises a base 17a, a somewhat modified balancing head 76 and a four ball pivot mechanism 77. The base 17a is like the base of FIG. 2 with the exception that, instead of supporting the anvil and its three support balls by a rigid post, the base 17a supports the anvil through a spring mounting. Parts of the FIG. 3 embodiment that are substantially identical to parts of the FIG. 2 embodiment will be given identical reference numerals followed by suffix "a."

A circular plate 19a, which is welded to the lower wall of the bowl 18a, mount a spring pilot 80. A spring 82, whose lower end encircles the stub shafts, supports a cylindrical hardened steel anvil plate 26a at its upper end. The anvil plate is secured to a depending cylindrical skirt 84, and is formed with an upper spherical concave surface 29a on which lower support balls 28a rest. The depending skirt 84 is slidably mounted in the inner cylindrical surface of a sleeve 87 that is welded at its lower end to the bowl 18a and, at its upper end, carries an inturned retaining lip 86.

The balancing head Ha of FIG. 3 is basically the same as the balancing head H of FIG. 2. In the form of FIG. 3 the centering cone assembly 55a is provided with an inner sleeve 88 which slides along the outer surface of tubular sleeve 36a. A more significant difference in the head Ha is the use of a rubber cushion for the pivot ball 30a instead of Belleville washers. In order to centrally mount the pivot ball 30a, a circular plate 89 is clamped between the level unit La and the upper end of the tubular sleeve member 36a by a threaded cap 67a. The pivot ball 30a is slidable in a depending confining tube 90 that projects down from the pad 89. A shock absorbing disc 92 formed of rubber or other rubber-like resilient material disposed within the tube 90 at the undersurface of the plate 89 to receive the upper portion of the ball 30a. The ball is retained in the tube 90 by a spun lip 94. The axis of the cylindrical confining tube 90 coincides with the midpoint of the level La.

As before, the radius of the spherical anvil surface 29a equals the sum of the radius of the pivot ball 30a and the diameter of a support ball 28a. As a result, the effective or virtual pivot point c of the balancing head Ha is at the center of the pivot ball 30a and remains on the axis of the anvil supporting post structure 84,87 during balancing. Again, the three supporting balls 28a undergo limited rolling motion over the surface of the pivot ball 30a during balancing. The balancing head thus has a pivot point which is independent of the alignment or misalignment of the axis of the vertical support sleeve or post 87 and of the base in general.

The rubber pad 92 and the spring 82 act to protect the pivot ball 30a and the support balls 28a from damage due to excessive impact or static weight loading of the wheel balancer. At a certain threshold loading, the plate 89 will engage the post flange 86, and beyond this point no additional loading is placed on the balls.

EMBODIMENT OF FIGS. 4 AND 5

Figure 4:
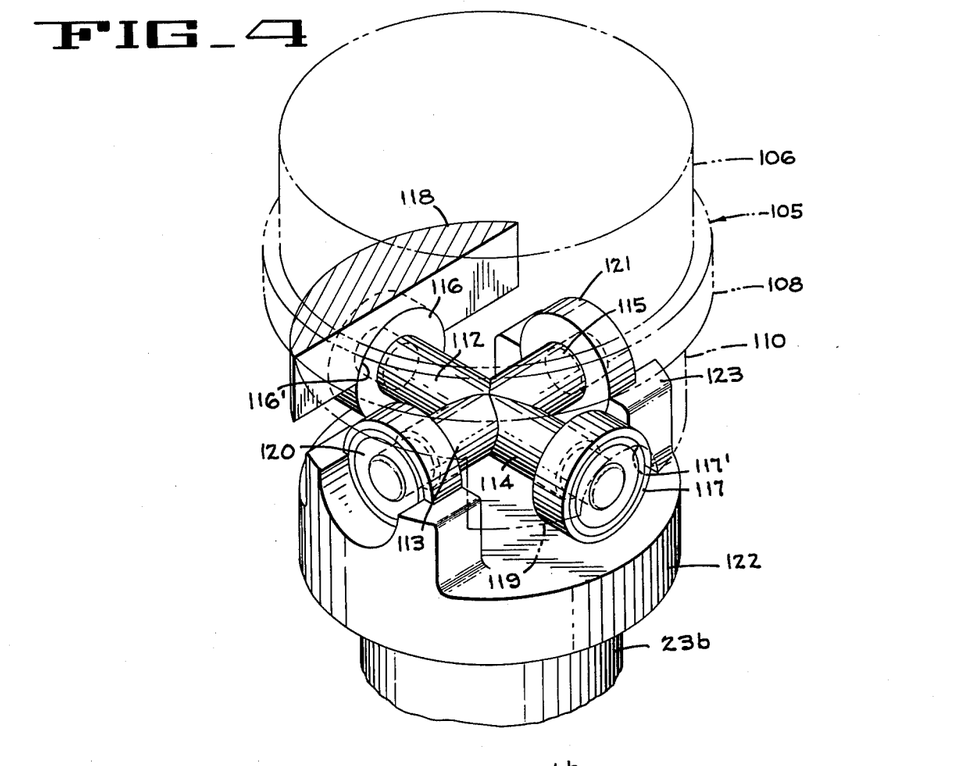
FIG. 4 is an isometric view of the self-leveling pivot means of an embodiment of the invention employing a Hooke joint pivot structure.
Figure 5:
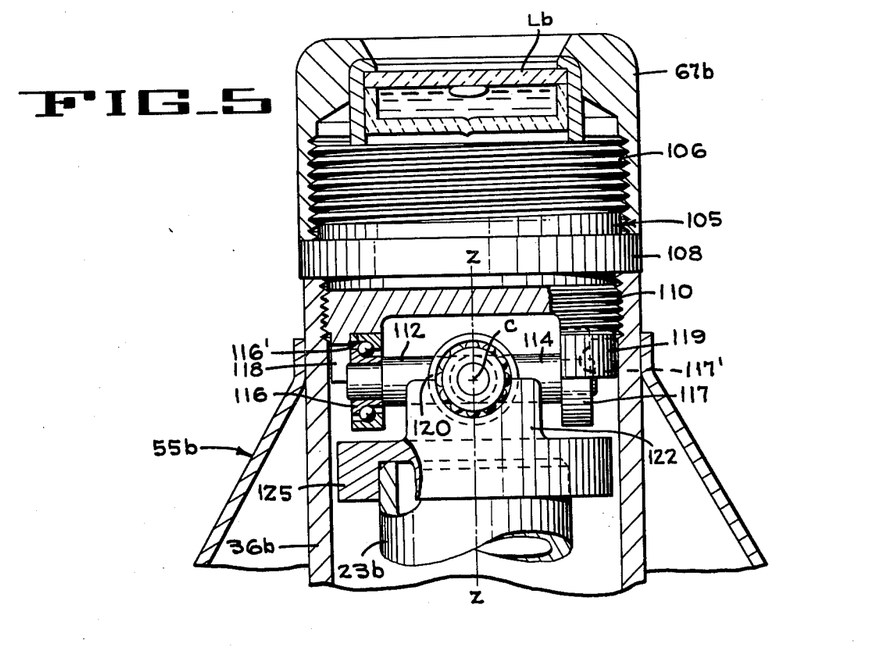
FIG. 5 is a section, partly in elevation, of the embodiment of the invention shown in FIG. 4.

The embodiment of FIGS. 4 and 5 operates on the same principle of pivot point location as that previously described. However, a Hooke universal joint is employed in lieu of the pivot ball assembly of FIGS. 1 and 2. Those elements of FIGS. 4 and 5 that are substantially identical in formation to those of FIG. 1 will be given identical reference numerals followed by the suffix "b." The base (not shown) mounts a pedestal or post 23b that is rigidly supported from the base, as in FIG. 1.

The balancing head has a sleeve member 36b and mounts a wheel centering cone 55b like that of FIG. 1. However, as seen in FIG. 5 the balancing head cap 67b is not threaded onto the tubular sleeve member 36b but is threaded onto a generally cylindrical yoke block 105 that has an upper threaded cap mounting portion 106, an intermediate flange 108 and a lower threaded yoke mounting portion 110. The spirit level unit Lb is clamped between the cap and the top of the block 105. The intermediate flange 108 is held against the upper end of tubular member 36b by the threaded portion 110. The member 36b has a cup (not shown) at its lower end, as in FIG. 1.

The pivot mechanism of FIGS. 4 and 5 is a single universal joint, the joint shown being a Hooke joint having a rigid spider formed with four arms 112-115. The arms 112 and 114 are in alignment and provide one pivot axis, and the arms 113 and 115 are also in alignment and provide a second pivot axis which is perpendicular to and intersects the first axis. Stub shafts projecting from the ends of arms 112 and 114 are journaled in anti friction bearings 116 and 117, respectively, which are pressed into recesses 116' and 117' formed in spaced yoke segments 118 and 119 that depend from the lower threaded section 110 of the yoke block 105. Similarly, stub shafts on the ends of arms 113 and 115 are journaled in anti friction bearings 120 and 121 which are pressed into yokes 122 and 123, respectively, that are formed on and project upwardly from opposite sides of a yoke mounting block 125 pressed on the upper end of a post or pedestal 23b.

When mounted on a universal pivot such as that just described, the balancing head is free to independently pivot about two perpendicularly oriented axis, both of which lie approximately in a horizontal plane in the normal or balanced position. These axes intersect at a vertical pivot point $c$ that lies on the axis $z$—$z$ of the post 23b. Thus, if the post 23b does not have a true vertical orientation, the pivot mechanism allows the balancing head to adjust itself to a true vertical orientation, with the wheel supporting flange 38 (FIG. 2) in the horizontal plane.

EMBODIMENT OF FIGS. 6 - 8

Figure 6:
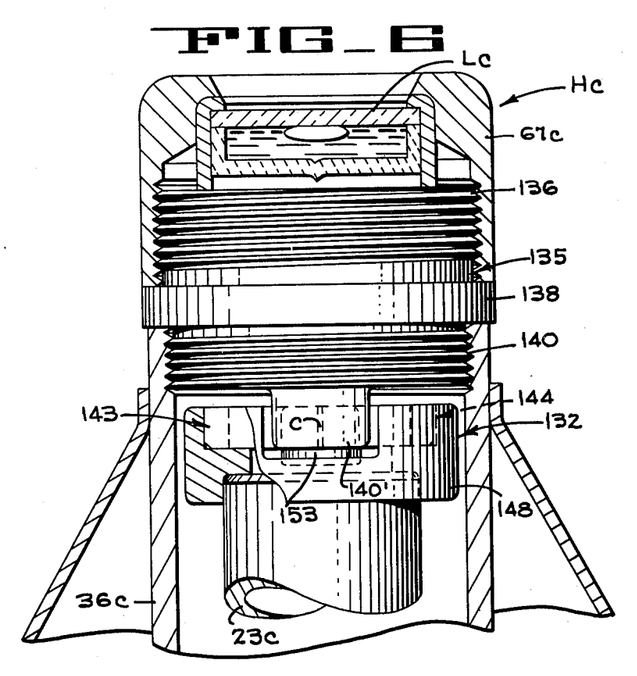
FIG. 6 is a vertical section, with parts in elevation, taken centrally through a portion of an embodiment of the invention employing a Hooke type joint pivot structure.
Figure 7:
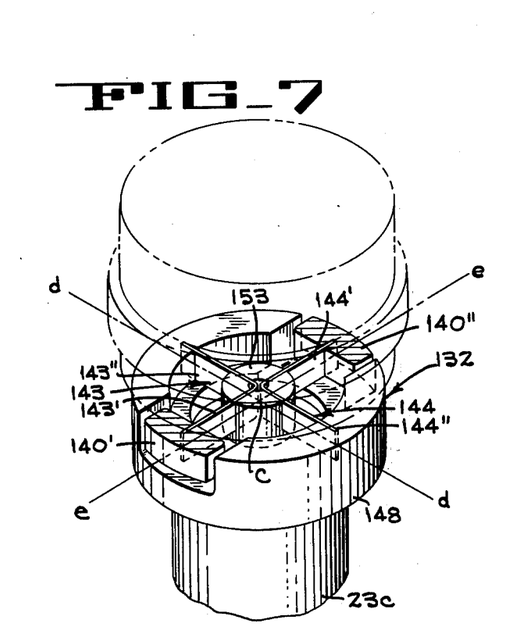
FIG. 7 is an isometric view of the self-leveling pivot means of FIG. 6.
Figure 8:
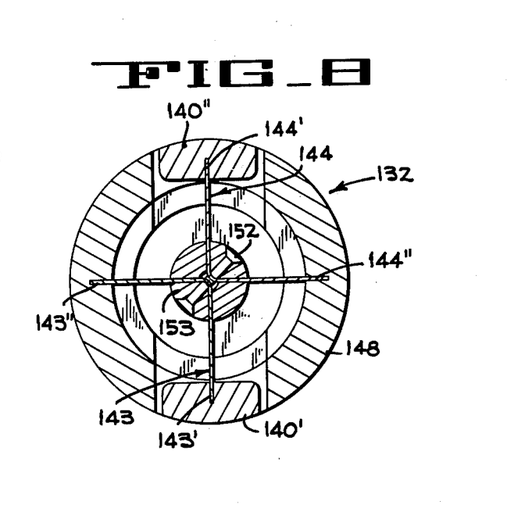
FIG. 8 is a horizontal section through the pivot means of the embodiment of the invention shown in FIG. 6.

The embodiment of the invention shown in FIGS. 6 - 8 is a universal joint of the Hooke type wherein the mechanical pivot action is replaced by a flexing action of the spider arms. The post 23c mounted a balancing head Hc by means of a pivot mechanism 132. The parts not illustrated in this embodiment are similar to those of FIG. 1 and those parts of FIGS. 6 - 8 that have counterparts in FIG. 1 will be given identical reference numerals followed by the suffix "c."

The balancing head Hc is like that of FIGS. 3 and 4 wherein the cap 67c is threaded onto a generally cylindrical block 135 that has an upper threaded portion 136, an intermediate flange 138 and a lower threaded portion 140 that threads into the sleeve 36c. The spirit level Lc is clamped between the cap and top of block 135. The sleeve 36c has a cup at its lower end that mounts the wheel, as in FIG. 1.

The pivot mechanism 132 is formed by thin, flexible flat plates formed of steel or strong plastic, which plates cooperate to form a four arm yoke that provides a universal effective pivot point $c$ (FIG. 5) that is always disposed on the vertical axis of the post 23c. In the embodiment shown, the yoke is formed by the assembly of two thin bent plates or blade units 143 and 144. The blade unit 143 has flexible arms 143' and 143" perpendicular to each other, and the blade unit 144 has perpendicularly flexible arms 144' and 144". The arms 143" and 144" are embedded in slots formed in a yoke or a mounting block 148 pressed on the upper end of the post 23c. The arms 143' and 144' are firmly embedded in two spaced yoke tongues 140' and 140" depending from the lower threaded portion 140 of the balancing head yoke block 135. The two blade units 143 and 144 are connected by mounting their apices in a slotted central hub 153 and are retained by a rivet 152. The weight of the wheel to be balanced is transmitted through the blade 143 and 144 to the post 23c, these units being substantially inflexible in the vertical direction.

Referring to FIG. 7 it will be noted that the arms 143", 144" provide means whereby the balancing head can pivot about axis $d$—$d$ that passes through the effective point $c$. The arms 143' and 144' provide means whereby the balancing head can pivot about axis $e$—$e$ that is at 90° to the axis $d$—$d$ and also passes through the point $c$. This action is possible since all blades are thin resilient members. Thus when a wheel is placed on the balancer and the load is transferred to the blades, they can pivot about one of two axes or simultaneously about both axes. In this manner, the vertical orientation of the balancing head is made independent of the vertical orientation of the pedestal 23c, as in the other embodiments.

EMBODIMENT OF FIGS. 9 AND 10

Figure 9:
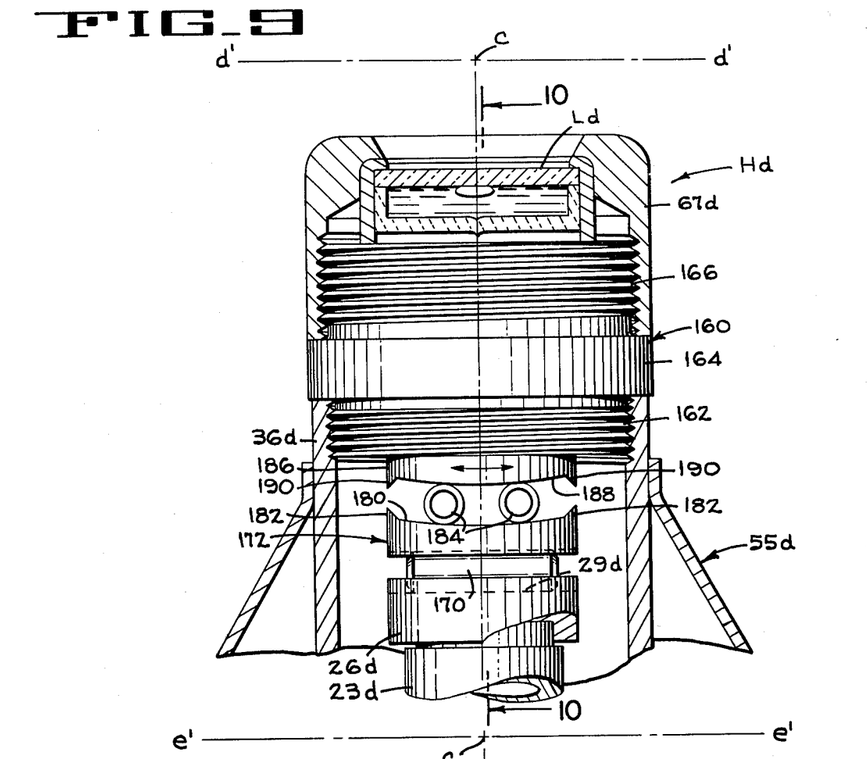
FIG. 9 is a fragmentary vertical section, with parts in elevation, of an embodiment that employs rollers in the pivot system.
Figure 10:
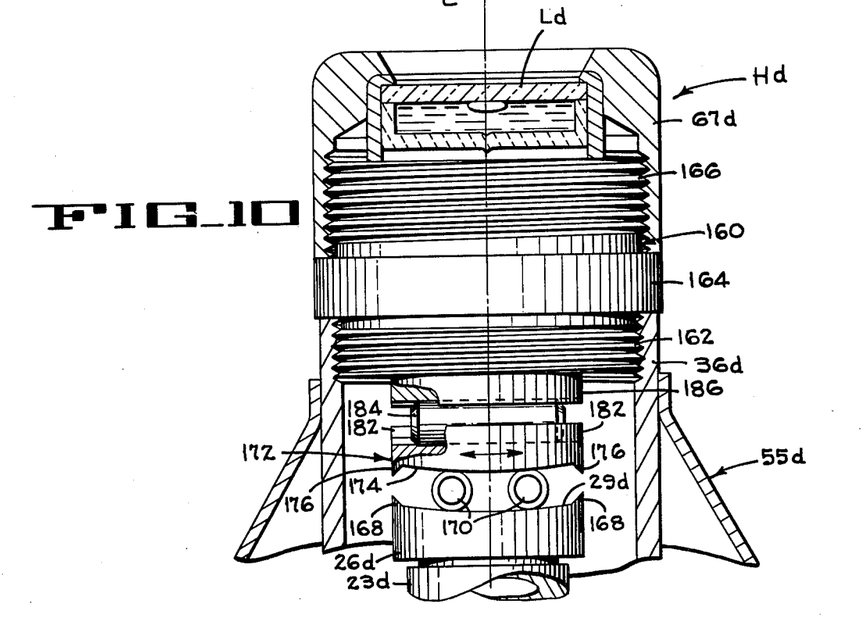
FIG. 10 is a view of the elements of FIG. 9 looking in the direction of the arrows 10 — 10 on FIG. 9.

The roller pivot embodiment of FIGS. 9 and 10 employs two sets of cylindrical rollers operating on cooperating cylindrical anvil surfaces to produce a universal pivot joint having the pivot characteristics of the previously described embodiments. The balancer of this embodiment is provided with a post 23d which is mounted on a base or support by the floor as previously described. The upper end of the post is fitted with an anvil member 26d the upper face of which is provided with a cylindrical anvil surface 29d to be described in more detail presently. The balancing head Hd is basically the same as those previously described. The head includes a tubular sleeve 36d which slidably mounts a centering cone 55d, as before. The head has a threaded cap 67d that mounts the level Ld.

The embodiment of FIGS. 9 and 10 also embodies the principle of the embodiments of FIGS. 2 and 3 and in some respects resembles those embodiments except that rollers are employed instead of pivot balls. In other respects, the embodiments of FIGS. 9 and 10 resembles those of FIGS. 4 - 8 in that the universal pivot action takes place about mutually perpendicular axes.

A cylindrical plug 160 is threaded at 162 into corresponding threads in the sleeve 36d to bring a flange 164 of the plug against the upper end of the sleeve. The plug 160 is threaded at 166 to receive the cap 67d, which clamps the level Ld against the upper face of the plug.

As to the universal pivot structure, the anvil 26d has a concave cylindrical bearing surface 29d formed on the upper face thereof as previously mentioned, which face is bounded by confining lips 168 (FIG. 10). Two equal diameter hardened steel cylindrical rollers 170 (FIG. 10) are supported by the spherical anvil face 29d.

An intermediate swivel block 172 has a lower, convex cylindrical face 174, flanked by confining lips 176 (FIG. 10). The convex cylindrical face 174 of the swivel block is supported by the rollers 170. The axes of the concave spherical anvil face 29d and the convex spherical swivel block face 174 are coincident and are indicated as a common axis $d'$—$d'$ in FIG. 9. This axis is perpendicular to and intersects the axis of the post 23d at an effective or virtual pivot point for the assembly, indicated at $c$, as before. The axis of the rollers 170 is parallel to the axis of the cylindrical surfaces upon which they engage.

The swivel block 172 has an upper concave cylindrical face 180 (FIG. 9) flanked by confining lips 182. A second set of equal diameter rollers 184 are supported by the concave cylindrical swivel block surface 180. The lower end of the plug 160 is formed with an integral pad 186 having a lower concave cylindrical surface 188 flanked by confining lips 190 (FIG. 9). The surface 188 is supported by the upper set of rollers 184. The axes of the concave spherical swivel block surface 180 and the convex upper pad surface 188 are coincident, the common axis being indicated at $e'$ — $e'$ in FIG. 10. The common axis $e'$—$e'$ is perpendicular to and intersects the common axis $d'$—$d'$ of the lower set of rollers (FIG. 9) and the axis $e'$—$e'$ is also perpendicular to the axis of the post 23d and passes through the virtual pivot $c$, as shown in FIG. 10.

This construction provides a free rolling universal pivot action about the virtual center c, which center has the geometrical characteristic previously described, so that the balancer of the embodiment of FIGS. 9 and 10 is also self-levelling as that term has been explained previously.

In the preferred embodiment, the diameters of the rollers 170,184 is preferably ¼ inch and these rollers, and their associated anvil surfaces are formed of hardened steel.

Although the best mode contemplated for carrying out the present invention has been herein shown and described, it will be apparent that modification and variation may be made without departing from what is regarded to be the subject matter of the invention.

I claim:

1. In a wheel balancer of the type comprising a post having a generally vertical axis, means for supporting said post on the floor, a wheel balance head having means for mounting and centering a wheel to be balanced in a plane that is normally horizontal, a level on said head, and universal pivot means for mounting said balance head on said post for freely accommodating tilting of said balance head plane relative to said post about a pivot point in response to wheel unbalance, the pivot point of said balance head plane being coincident with the axis of said post when the post axis is vertical; the improvement wherein said pivot means comprises an anvil on the upper end of said post, a concave cylindrical bearing surface formed on the upper face of said anvil, a first set of equal diameter cylindrical rollers on said concave anvil surface; an intermediate swivel block having a lower face formed with a convex cylindrical surface supported by said rollers, the axes of said cylindrical surfaces being coincident to form a common axis that is perpendicular to and intersects the axis of said post, the axes of said rollers being parallel to that of said cylindrical surfaces; said swivel block having an upper face formed with a concave cylindrical surface, a second set of equal diameter rollers on said concave swivel block surface, and a mounting block on said balancing head, said mounting block having a lower surface formed with a convex cylindrical surface supported by said second set of rollers; the axes of said latter named cylindrical surfaces being coincident to form a common axis that is perpendicular to and intersects the common axis of said first named cylindrical spherical surfaces at the axis of said post.

2. The balancer of claim 1, wherein the diameter of said rollers is not substantially less than ¼ inches.

* * * * *